Jan. 20, 1959  D. M. SCHULZ  2,869,414
STRIP-ADAPTOR FOR SPECTROPHOTOMETERS
Filed May 12, 1954  4 Sheets-Sheet 1

INVENTOR.
DALE M. SCHULZ,
BY

ATTORNEYS.

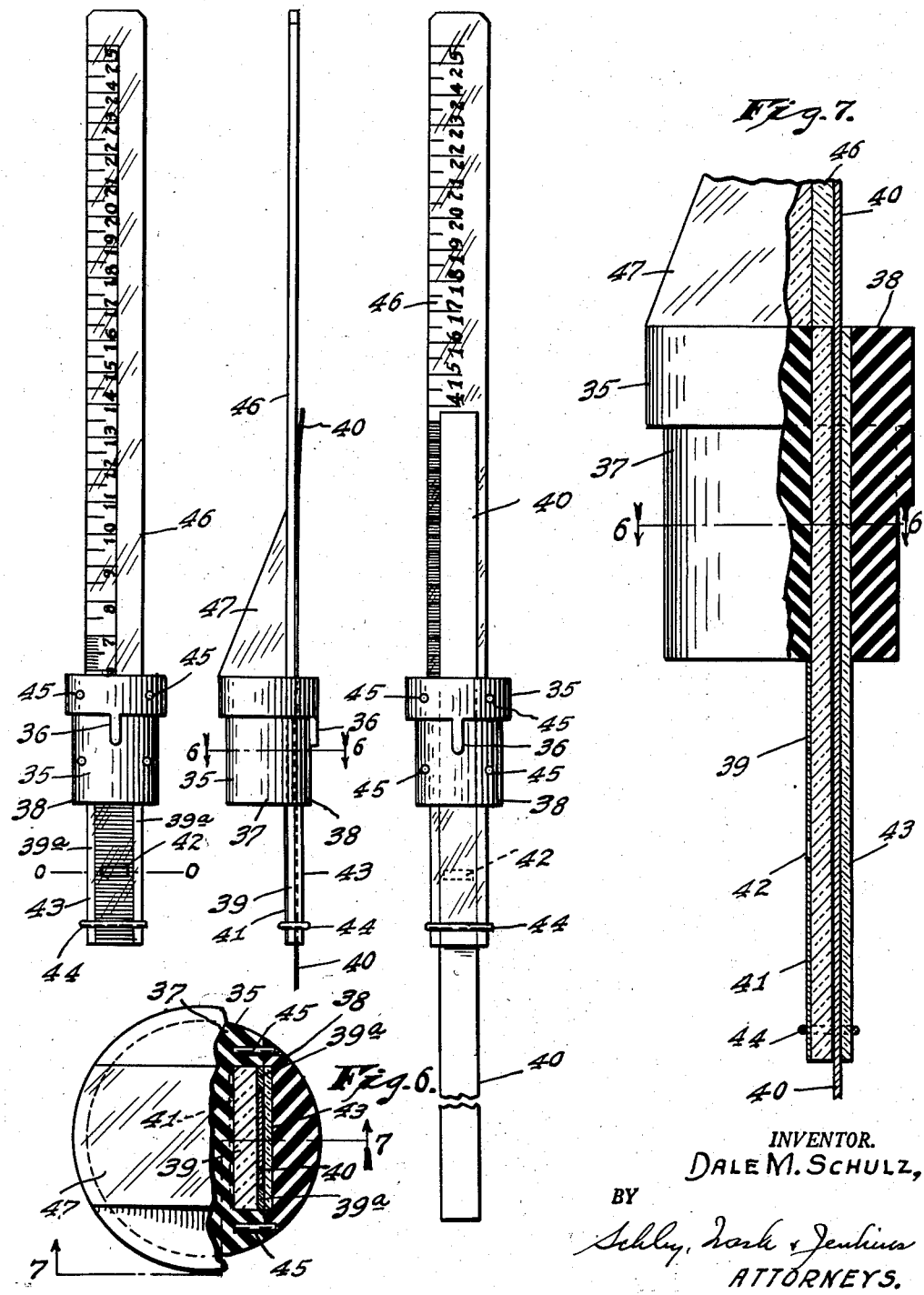

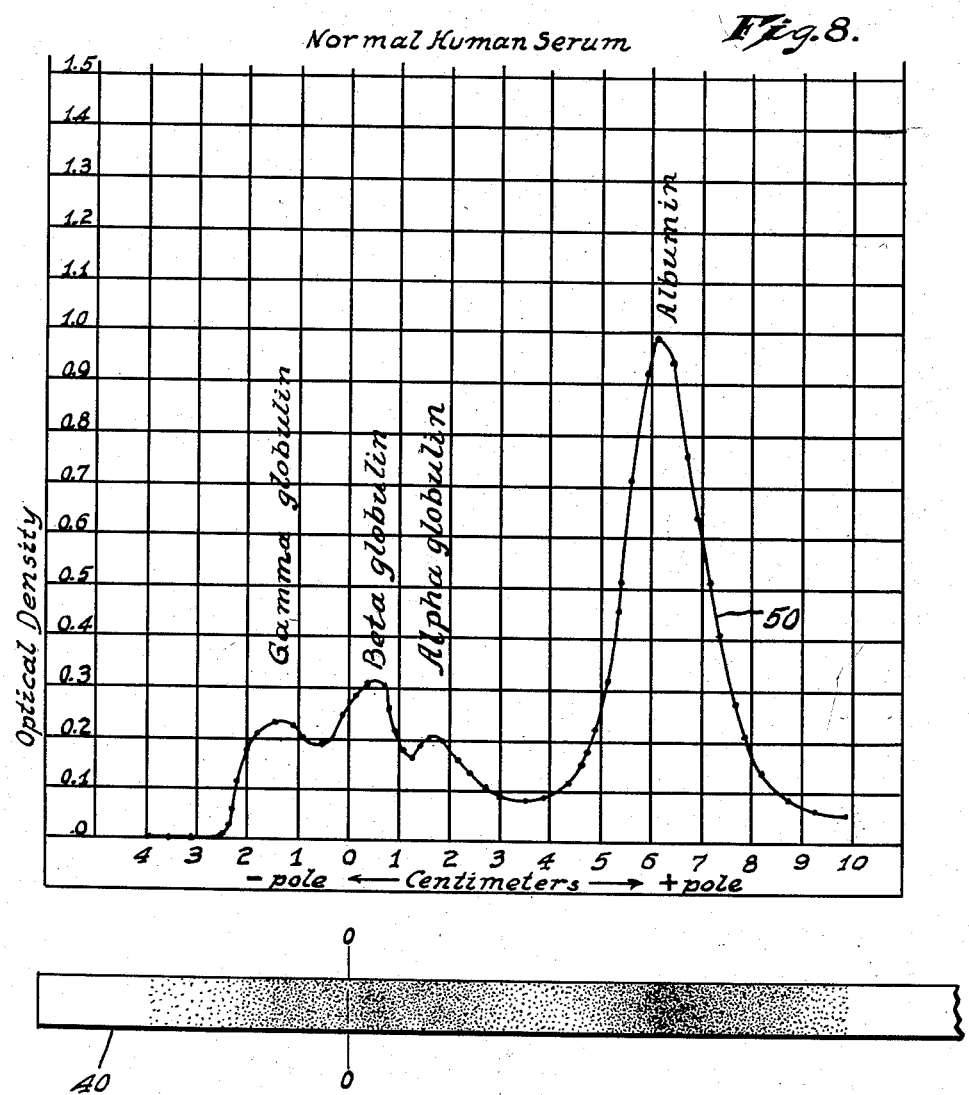
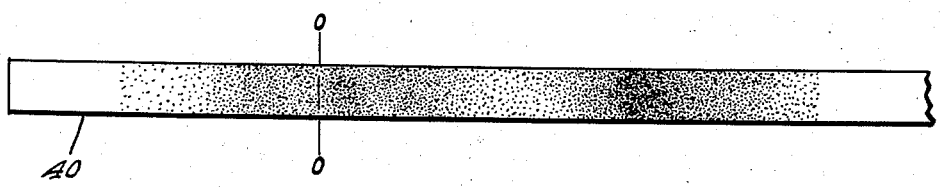

United States Patent Office 2,869,414
Patented Jan. 20, 1959

2,869,414

STRIP-ADAPTOR FOR SPECTROPHOTOMETERS

Dale M. Schulz, Indianapolis, Ind., assignor to The James Whitcomb Riley Memorial Association, Indianapolis, Ind., a non-profit association of Indiana Application May 12, 1954, Serial No. 429,225

2 Claims. (Cl. 88—14)

It is the object of my invention to adapt a spectrophotometer which spectrophotometrically analyzes only uniform liquids to the spectrophotometric analysis of strips (as of paper) having varied light-absorbent capacities along their lengths. It is an incidental object of my invention to provide a new method and apparatus for such spectrophotometric analysis of such strips; and more especially for the spectrophotometric analysis of absorbent-paper strips carrying linearly distributed blood-protein fractions which have been distributed linearly along the paper strip by electrophoresis and then stained.

More specifically, it is the object of my invention to adapt a spectrophotometer normally capable of measuring only the light transmitted through (or the light absorbed by) a uniform liquid held in a container to the quantitative measurement of the light transmitted (or absorbed) at various points along a strip.

The specific spectrophotometer to which my invention is especially adapted, and in connection with which I have illustrated such invention, is the one known as the Coleman Junior Spectorophotometer, manufactured by the Coleman Instruments Corporation, of Maywood, Illinois; and to make my invention clear I shall describe various features of that spectrophotometer in some detail.

Paper-strip electrophoresis is a known laboratory procedure, which has been developed in a number of laboratories, as for the quantitative analysis of the various proteins in blood. In that paper-strip electrophoresis, a small quantity (such as 0.01 ml.) of blood serum is placed at a selected intermediate zero-point on an absorbent-paper strip (such as filter paper) saturated with an electrolyte solution, and a direct electric current caused to flow along that strip. The electric current causes the different proteins of the blood to travel different distances from the zero-point linearly along that strip in one direction or the other; and both the absolute and relative amounts of the different proteins can be determined by analysis in one way or another of the quantity of proteins at different points along the strip. The distribution of the proteins along the strip depends upon a number of factors, including the character of the electrolyte, the temperature, and the intensity of the current; with an alkaline electrolyte at about pH 8.6 all the proteins in the blood serum except the gamma globulins travel along the strip toward the positive pole. The albumins travel the greatest distance, the alpha-globulins a somewhat less distance, and the beta-globulins a still shorter distance; while the gamma-globulins travel in the opposite direction toward the negative pole. In this way the albumins and the several globulins are linearly distributed along the strip. This dispersal of blood proteins along a paper strip by electrophoresis is a known procedure, well understood by blood-chemists.

The relative amounts of the various blood proteins—the albumins, the alpha-globulins, the beta-globulins, and the gamma-globulins—can be determined in several ways, as by chemical analysis of the deposits at different points along the paper strip, or by staining the proteins deposited on the strip (and washing out unadsorbed dye) and determining such amounts by light absorption. My present process relates to this latter method; but differs from the methods and apparatus previously used in that it involves the use of light within a narrow wave-length band (so that it is substantially monocrhomatic) that is largely absorbed by the dye used for staining the deposited proteins. I prefer to use a red stain, produced by immersing the paper strip in a solution of the red dye azocarmine B, and analyze the density of the dye adsorbed upon the various proteins by its power to absorb a light-green light of a wave length in the neighborhood of 550 micromillimeters; so that the light and the dye are of substantially complementary colors.

In making this light-absorption analysis, I use a standard spectrophotometer (conveniently the Coleman Junior Spectrophotometer), hitherto used only for determination of light absorption in liquids; but provide that standard spectrophotometer with an adapter which permits the desired strip with the stained proteins distributed along it to be analyzed at any number of points along the strip by feeding the strip past a light-metering window provided in the adapter and through which the substantially monochromatic light passes on to a photoelectric cell which controls the movement of a reflecting galvanometer. An important part of my invention is this adapter for strip analysis.

The accompanying drawings illustrate my invention:

Fig. 3 is a front elevation of my strip adapter, without a strip;

Fig. 4 is a side elevation of that strip adapter, with a paper strip therein;

Fig. 5 is another front elevation of that strip adapter, something like Fig. 3 but with a paper strip therein;

Fig. 6 is an enlarged plan of my strip adapter, in partial section on the line 6—6 of Figs. 4 and 7;

Fig. 7 is an enlarged partial elevation, in partial section on the line 7—7 of Fig. 6, of the strip adapter, to show more detail than do Figs. 3, 4, and 5;

Fig. 8 is a graph made from observations taken with the apparatus of the preceding figures, in position over the paper strip from which the graph was drawn to show the relation of the several peaks of the graph to the more dense deposits of proteins on the paper strip.

Figure 1:
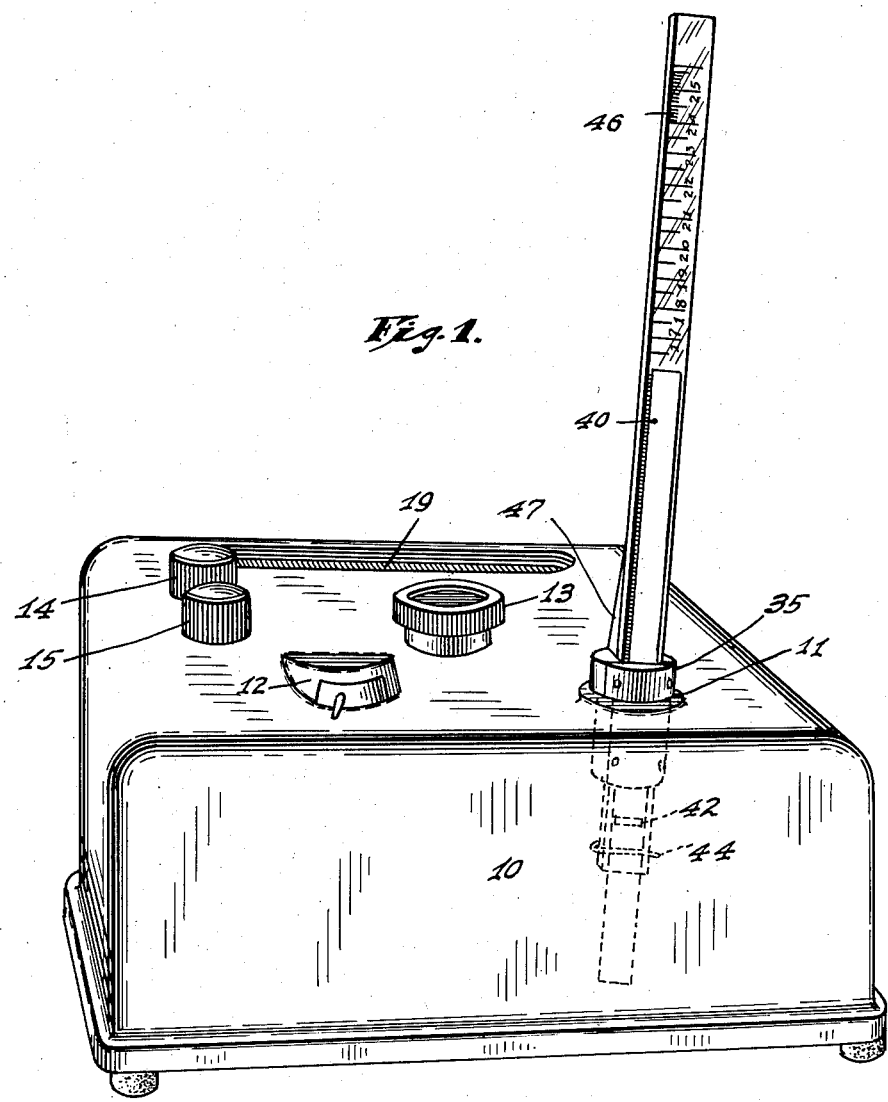
Fig. 1 is a perspective view of a standard spectrophotometer (the Coleman Junior Spectrophotometer) equipped with my strip adapter.
Figure 2:
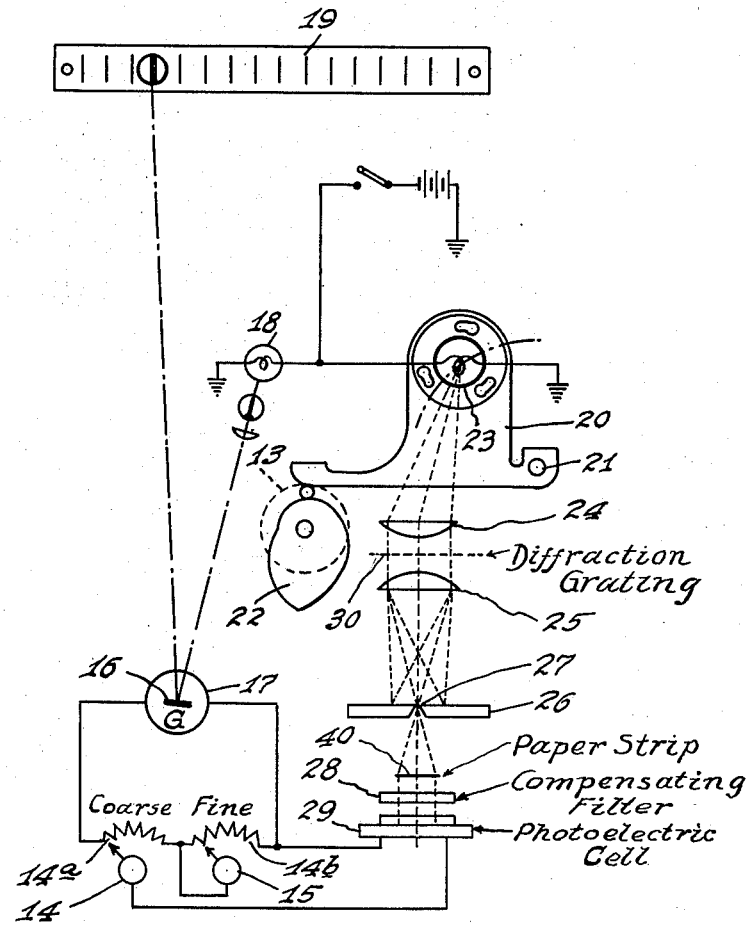
Fig. 2 is a diagram showing schematically the optical, electrical, and mechanical essentials of that spectrophotometer, with my strip adapter in use therein.

In the known spectrophotometer to which my strip adapter is applied as shown in Figs. 1 and 2, a case 10 has a well 11 in which cuvettes (such as test tubes) containing liquid are placed for determination of color density. That spectrophotometer has a galvanometer-adjusting lever in a housing 12, a wave-length-adjusting dial-knob 13 for adjusting the wave-length of the light used, and coarse and fine adjusting knobs 14 and 15 for controlling rheostats 14$^a$ and 15$^a$ to adjust the light-spot reflected by the mirror 16 of the galvanometer 17 from the light source 18 on to the scale 19 to zero position for uncolored material. Within the case 10 is a light-bulb-carrying arm 20 pivoted at 21 and swingable around that pivot by a cam 22 rotatable by the wave-length-adjusting dial-knob 13. The light-bulb-carrying arm 20 carries a light bulb 23 from which light is directed through a pair of condensing lenses 24 and 25 to a light-shield 26 having an exit slit 27 through which a ribbon of light may pass to and in part through the liquid-holding cuvette, and thence on through a compensating filter 28 to a photoelectric cell 29. Between the condensing lenses 24 and 25 is a diffraction grating 30, which spreads out the light beam from the light bulb 23 into a spectrum shining on the light-shield 26. Only a narrow band of this spectrum passes through the exit slit 27 of that light-shield and on through the liquid in the cuvette, where some absorption of light occurs depending upon the depth of color of the liquid, to the photoelectric cell 29. The location of that narrow band or ribbon of light in the spectrum is controlled by manipulating the wave-length-adjusting dial-knob 13; so that that dial-knob controls the substantially monochromatic color of the light passing through the exit slit 27 of the light-shield 26.

According to my invention, I do not use liquid-containing cuvettes in the well 11. Instead, I mount in the well 11 a special strip-handling device by which the monochromatic light from the light source 23 and diffraction grating 30 on its way to the photoelectric cell 29 is caused to pass through various points along the strip at which the latter is stopped in its movement along said strip-handling device, to produce a series of galvanometer readings from which graphs can be drawn to show the color absorption (or color transmission) through said various points along the strip.

That strip-handling device is shown in detail in Figs. 3 to 7 inclusive. It is supported on a plug 35 which fits into the well 11, in a position predetermined by a rib 36 provided on the plug 35 and meshing with a corresponding the groove on the inside of the well. The plug 35 is split longitudinally into two segments 37 and 38, desirably larger and smaller segments as is clear from Figs. 6 and 7. The larger plug-segment 37 carries a depending paper-strip guide-plate 39, conveniently made of transparent plastic material, against one face of which lies a paper strip 40 to be read. The strip is slidable along the guide-plate 39, desirably in a suitable groove conveniently made by suitable spacer strips 39a (as is clear from Fig. 6) and just sufficiently deep to permit the strip to be slid along it by a slight pull on one end of the strip. The other face of the guide-strip 39 is suitably made opaque, as by being covered with a black-paper layer 41, save for a light-metering window 42 at the level of the monochromatic ribbon of light from the exit slit 27. The smaller plug-segment 38 is provided with a depending transparent pressure-plate 43 for lightly holding the paper strip 40 in the groove in the guide-plate 39. Usually it is desirable to hold the pressure-plate 43 against the guide-plate 39 by a removable spring-wire clamp 44. The two plug-segments 37 and 38 are desirably provided with positioning dowel pins and holes 45 to make certain that the two segments of the plug and the parts carried thereby are always put together in the same relative positions. The larger plug-segment 37 also carries a scale 46 projecting upward from it, and measuring distances from the mid-point of light-metering window 42, conveniently in centimeters. To steady the upstanding scale 46 it is desirably provided near the base with a triangular strut 47 resting upon the top of the plug-segment 37 as is clear from Fig. 4. As shown, the parts 37, 39, 46, and 47 are made of separate pieces glued or otherwise fastened together, and so are the parts 38 and 43; but there is no reason why each of these sets of parts need be made as a composite structure instead of as a one-piece structure, as of transparent plastic. But it is desirable that the plug-segents 37 and 38 be made opaque, as by being of opaque plastic or by being painted, to keep light from the outside from passing down into the interior of the device through the well 11.

When the device is used for analyzing blood-proteins, the strip 40 is made of absorbent paper, such as filter paper, and blood proteins from a sample blood serum are caused to be distributed along it by electrophoresis in known manner. The paper strip is saturated with a suitable soluble dye, desirably the red dye azocarmine B, and excess dye is removed by suitably washing the paper strip, as in dilute acid, leaving the dispersed blood-proteins colored by the dye which they have adsorbed. Then, after the strip has been dried, and desirably after it has been dipped in a clarifying agent (such as thin oil), it is placed in the strip holder of the modified spectrophotometer, in the manner indicated in Figs. 4, 5, 6, and 7, and moved step by step upward along the strip holder, with such stops as are desired (usually every five millimeters); and with readings of either light transmitted or light absorbed by the strip at each stop. The galvanometer readings obtained, desirably of optical density (on a logarithmic scale), are plotted against the distances along the strip, as indicated in Fig. 8, to produce a graph 50 showing the distribution of the various blood-proteins. The graph shows peaks—going from right to left—for the albumins, the alpha-globulins, the beta-globulins, and the gamma-globulins, corresponding to the galvanometer values observed. The relative quantities, and even the absolute quantities if correlated with a chemical determination of total proteins, of these different blood-proteins can be determined by measuring the areas of the several peaks of the graph above the zero line, as with a planimeter; which for the observations recorded on the graph show areas and therefore relative protein quantities as follows:

|  | Areas of Peaks, sq. cm. | Approximate Percentages |
| --- | --- | --- |
| Albumins | 21.55 | 64.5 |
| α-globulins | 4.05 | 12.2 |
| β-globulins | 4.2 | 12.6 |
| γ-globulins | 3.6 | 10.8 |
| Total area | 33.40 | [1] 100.1 |

[1] Total percentages.

In order to obtain the best readings, the monochromatic light used is of light-green color of approximately 550 micromillimeters wave-length, when the dye used is a red dye; but it is sufficient if the color of the dye and of the light beam are approximately complementary. However, for comparing the protein distribution of different blood samples along different paper strips, it is desirable to standardize on the dye and on the wave-length; so that direct comparisons of one sample of blood with another can be made.

I have described my invention particularly with relation to the determination of blood-proteins, distributed along a paper strip by electrophoresis. But my invention is broader than that, for both the process of and the apparatus for analyzing light density along a strip can be used on other strips than those along which blood-proteins have been distributed; as for instance in paper chromatography.

I claim as my invention:

1. A strip adapter for spectrophotometers, comprising a strip-carrier having means adapting it to be removably received in the sample-holding well of a spectrophotometer to project in fixed position across the spectrophotometer's light-beam which is directed toward a photoelectric cell, said strip-carrier having (a) as its main carrying part a plug insertable into and removable from the well of the spectrophotometer and (b) a fixed guide-plate located in the spectrophotometer well and along which a strip may be moved across said light-beam and (c) means for holding said strip in adjusted position, which guide-plate has a light-metering window in said light-beam and is opaque to the passage of light save at that window, in which strip adapter there is a scale for measuring the position of the strip with respect to the window, said plug being split into two segments with said scale and said guide-plate both fixed upon the same segment of said split plug.

2. A strip adapter as set forth in claim 1, in which a transparent pressure plate is provided on the other segment of the plug for pressing the strip against the guideplate.

References Cited in the file of this patent

UNITED STATES PATENTS

| | | |
|---|---|---|
| Re. 23,653 | Stern | May 5, 1953 |
| 1,176,691 | Ricker et al. | Mar. 21, 1916 |
| 1,286,589 | Greene | Dec. 3, 1918 |
| 1,865,982 | Doorn | July 5, 1932 |
| 2,056,791 | Logan | Oct. 6, 1936 |
| 2,127,042 | Morrell | Aug. 16, 1938 |
| 2,457,913 | Nemeth | Jan. 4, 1949 |
| 2,498,030 | Davis | Feb. 21, 1950 |
| 2,519,997 | Brown | Aug. 22, 1950 |
| 2,632,361 | Krows | Mar. 24, 1953 |

OTHER REFERENCES

Faraday Society Transactions, vol. 33, 1937, pages 524–531.

Analytical Chemistry, vol. 22 #9, Sept. 1950, advertisement on page 8A.

Journal American Chemical Society, vol. 72, 1950, pages 2943–2948, Article by Durrum.